H. FAIRBANKS.
ELECTROMAGNETIC WEIGHING MACHINE.
No. 110,963. Patented Jan. 17, 1871.
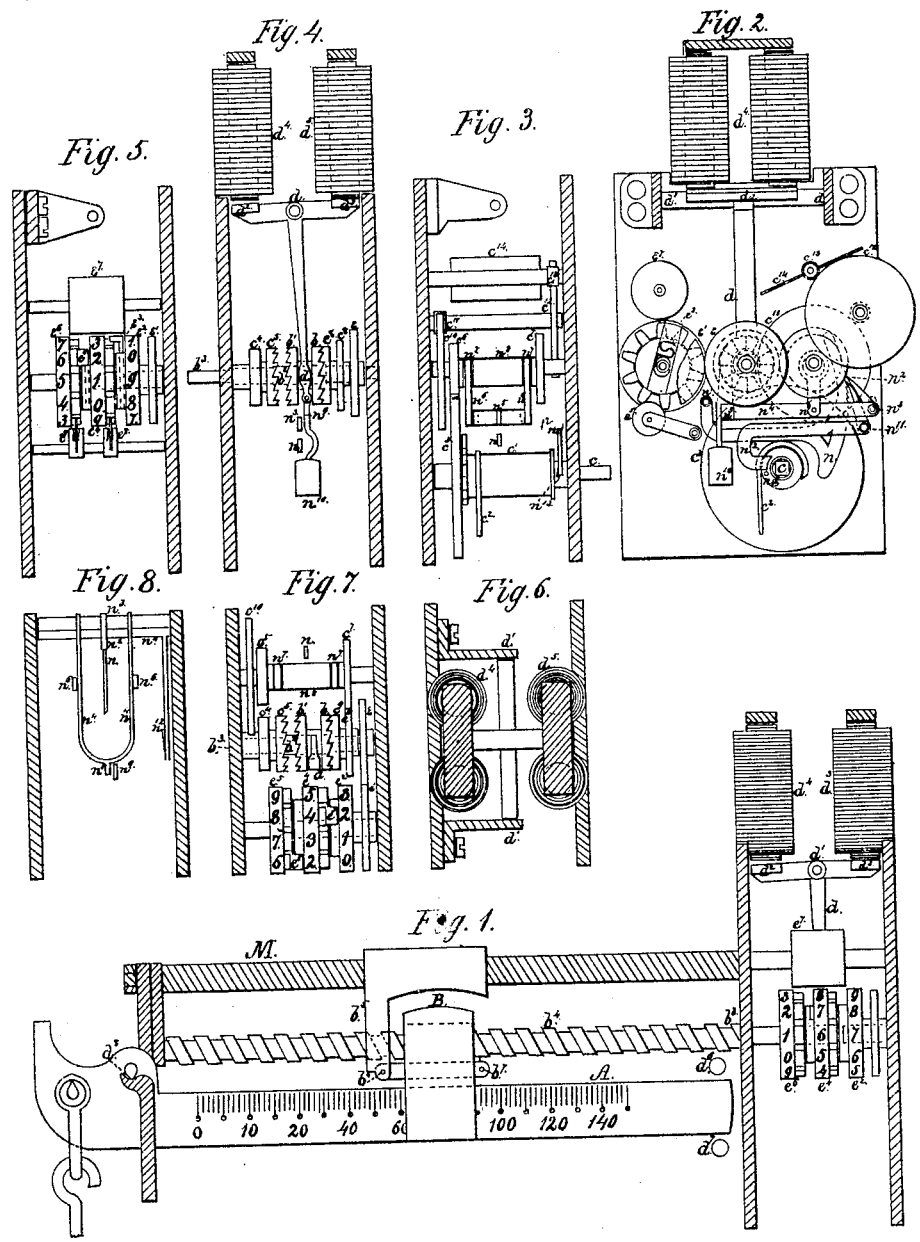
Witnesses,
Thaddeus Fairbanks.
A. N. Fairbanks.
Inventor.
Henry Fairbanks.

United States Patent Office.

HENRY FAIRBANKS, OF ST. JOHNSBURY, VERMONT.

Letters Patent No. 110,963, dated January 17, 1871.

IMPROVEMENT IN ELECTRO-MAGNETIC WEIGHING-MACHINES.

The Schedule referred to in these Letters Patent and making part of the same.

*To all whom it may concern:*

Be it known that I, HENRY FAIRBANKS, of St. Johnsbury, in the county of Caledonia, in the State of Vermont, have invented certain new and useful Improvements in Weighing-Machines, Machines for Ascertaining and Indicating Weights; and I do hereby declare that the following is a full and exact description thereof.

I denominate my improved weigher a "magnetic weighing-machine."

It has been heretofore proposed to use the electro-magnetic force to control the valves by which the flow of grain into or from the hopper of a grain-scale is governed, so as to secure uniformity in the quantity weighed at each operation.

This plan is obviously unsuited to weighing other material, or in variable quantities.

I have invented a machine in which both the sliding poise upon the scale-beam, by which weight is ascertained, and register-wheels, by which it is correctly indicated, are put under electro-magnetic control, so that the operation of weighing is mainly automatic.

Various parts of this machine may be modified to some degree without impairing the effect of the whole, and various improvements may be made.

I will proceed to describe what I now consider the best means of carrying out my invention.

I will afterward designate the several points which I claim as new.

The accompanying drawings form a part of this specification, like parts being similarly lettered in all.

It will be understood that the scale-beam shown may be that of an ordinary platform-scale, or may have the weighing-pan suspended directly from it.

Of the ordinary weighing-scale only such parts are exhibited as are required to indicate the relative position and working of the devices which I have added.

Figure 1 is a front view of the scale-beam, its sliding poise, and a portion of the magnetic machine.

Figure 2 is an end view of the magnetic-machine, the end plate being removed to expose the interior.

Figure 3 is a partly sectional front view, showing the machinery of the back part.

Figure 4 is a similar view, showing the machinery of the middle part.

Figure 5 is a front view, showing the machinery of the front part.

Figure 6 is a plan view, showing the top of the machine.

Figure 7 is a partly sectional plan view, showing the machinery of the middle level.

Figure 8 is a similar view, showing the machinery of a lower level.

A is the scale-beam;

B, the weighing-poise sliding upon it.

The train of mechanism by which motion is communicated to the sliding-poise is indicated by $b$, $b^1$, &c., to $b^7$.

The last member of this series is a light bar, $b^6 b^7$, so connected as to communicate motion from the poise-slider $b^5$ to the poise B.

This connecting-bar is hinged at its ends loosely upon small steel pins, $b^7$, on the poise, and $b^6$ on the poise-slider, in such a manner as to offer the least possible resistance of friction to the tilting motion of the beam in weighing, and the position of these pins is such that the force exerted through the bar acts directly toward or from the supporting knife-edge of the beam when the beam is level, and therefore has no tendency to raise or lower it, and does not interfere with its weighing action.

I have used, in place of the level bar, friction-rollers, carried by the poise-slider on each side of the poise; and in another experiment a level cord-chain or small wire attached at its extremities to two arms of the poise-slider, and at its middle point to the poise.

These several devices have this feature in common, namely, that the line of action of the communicated force is so directed as to pass through the supporting knife-edge of the beam. This I deem essential to the correct working of the machine.

The poise-slider $b^5$ is moved in a line parallel to the level scale-beam, this parallelism being secured by the track or guide-rod M', which is rigidly attached to the frame-work of the machine.

Having its axis parallel to this is a screw, $b^4$, not in contact with the poise, but fitting a nut, which makes a part of the poise-slider $b^5$.

The pitch of this screw is the same as the space on the graduated scale-beam answering to ten pounds, so that each complete rotation of the screw carries the poise over this space.

The reason for this arrangement will appear in the description of my register.

The screw $b^4$ is attached at $b^2$ to the projecting end of the arbor $b^2 b^3$, so that they move together as one.

I have proposed as an equivalent for the screw to attach to the poise-slider a rack, to be carried by a pinion upon the projecting end $b^3$ of this arbor $b^2 b^3$, the magnetic-machine being, in that case, turned a quarter round, and suitably placed for the said rack to be moved by the said pinion.

I have likewise proposed to employ an endless chain carried by a rag-wheel, upon the end $b^3$ of the arbor $b^2 b^3$, and over a free pulley near the point of support of the beam, all parts being so placed that with the motion of the machine a point of the said chain shall move parallel to the scale-beam at the level of the supporting edge. I then attach the chain at this point directly to the poise, consider the weight of the supported portion a part of the weight of the poise, and dispense with the poise-slider.

In either case the mechanism remaining to be described would be the same as when the screw is used.

The middle portion $b^2$ of the arbor $b^2 b^3$ is square or splined, and carries upon it a spool-shaped piece, $b b^1$, which, fitting loosely, may slide lengthwise quite freely, while it can turn only with the arbor.

This piece $b b^1$ has its each end formed into a crown-ratchet, suited to engage and be carried by a similar crown-ratchet presented to it, being the end of a loosely-turning spool on the same arbor.

It will be understood that the two crown-ratchets of $b b^1$ face, on the two sides, two similar crown-ratchets $c^5 c^6$ carried upon two spools $c^4 c^4$.

These spools $c^4 c^4$ are free to turn upon the rounded parts of the arbor, and, carrying toothed wheels, are turned in opposite directions by the movement of the machinery.

To effect this movement I use a weighted cord or a spring attached in the manner used in clocks.

The weight hangs by $c^2$, which is wound upon $c^1$ by the use of a key upon the winding-post $c$.

The descent of the weight gives a left-handed or backward movement to the main wheel $c^3$.

This is geared to wheels $c^4 c^4$, giving them a forward motion.

On the arbor with $c^4$, and turning with it, is $c^7$, geared and giving backward motion to $c^8$.

The wheel $c^4$, turning forward, carries its crown-ratchet $c^5$ also forward, and $c^8$, turning backward, carries its crown-ratchet $c^6$ also backward.

To regulate the velocity of motion. I have introduced a retarder.

On the same arbor with the wheels $c^4$ and $c^7$ is another larger wheel, $c^{10}$, communicating motion through a series of pinions and wheels, $c^{11}$, $c^{12}$, and $c^{13}$, to a fan, $c^{14}$. This secures steadiness of movement.

Having described the arrangement for securing the rotation in opposite directions of the two spools $c^4 c^4$, and of the crown-ratchets $c^5 c^6$, which they carry, and also the construction and connections of the double crown-ratchet $b b^1$, I will next describe the arrangement by which $b b^1$ is made to clutch either $c^5$ or $c^6$, and receive motion from it.

The lever $d$ has its end properly shaped to work between the shoulders of the sliding-piece $b b^1$, and to act as a shifter, causing it, by one or the other of its crown-ratchets, to engage the corresponding ratchet of $c^5$ or $c^6$.

This lever extends from the arbor $d^1 d^1$, which is placed at right angles to the other arbors of the machine, and its motion is about this axis.

From the same arbor $d^1 d^1$ extend two arms, carrying armatures of soft iron, $d^2$ and $d^3$, in position to be respectively attracted by the electro-magnets $d^4$ and $d^5$, as one or the other is magnetized by the electric current carried through its coil.

There is just sufficient motion given to these armatures and through them to the shifting lever $d$ to cause the double crown-ratchet $b b^1$ to clutch $c^5$ or $c^6$.

It remains to describe the proper electrical connection of the magnets.

From the two magnets two terminal wires, that is, one from the coil of each, are united and connected with one pole of the galvanic-battery.

The other two terminal wires are carried separately, and that from $d^4$ is connected with an insulated piece of platinum, $d^6$, which is placed so as to limit the upward motion of the scale-beam, while that from $d^5$ is connected with $d^7$, a similar piece placed to stop the downward motion of the same.

The surfaces of the beam where it is to touch these stops, are also covered with platinum, so as to secure good electrical contact as it rises or falls.

The stops $d^6$ and $d^7$ being thus connected through the respective magnets with one pole of the battery, the scale-beam is connected with the other by a wire, not shown in the drawings, which is attached at $d^1$, close to the knife-edge, which is the axis of motion of the beam.

This wire is small, and runs directly back for some distance, so as to offer, by its torsion or bending, the least possible resistance to the free motion of the beam.

It will now be apparent that when the load to be weighed is upon the scale, if the poise is not out far enough to balance it, the beam striking $d^6$ will direct the electrical current about $d^4$, magnetizing it and causing it to attract its armature $d^2$.

When $d^2$ rises, the shifter $d$ is pressed to the left, $b^1$ clutches $c^5$, and receives its forward motion, which is communicated to the squared arbor $b^2$, and by it to the screw $b^4$.

This turning with a right-handed motion, draws out the slider $b^5$ and poise B until the increasing leverage of the poise causes the beam to descend.

When its contact with $d^6$ ceases, the current stops, $d^4$ is no longer a magnet, a light spring, not shown in the drawings, draws $d$ to the vertical position, and disengages $b^1$ from $c^5$.

The parts $b$ to $b^7$ are thrown out of action, and the poise B rests at the point corresponding to the weight of the load.

Had the poise been out too far to just balance the load the beam would have been in contact with $d^7$; $d^5$ would have been magnetized, causing $b$ to engage $c^6$, and receive its left-handed motion, which would have continued until the poise was at the proper point.

Having now shown the action of the machine in weighing, I will describe a train of mechanism, $n n^1$, &c., intended to stop the motion of the clock-work as soon as the load is weighed.

The light arc $n$, moving about the arbor $n^1$, is adapted to rise into the path of and stop the fan $c^{14}$. The outer edge of $n$ is a ratchet, into which work pawls $n^2$ and $n^{11}$, $n^2$, by its motion, gradually raising the arc $n$, and $n^{11}$ holding it as raised.

The pawl $n^2$ is loose upon its arbor $n^3$, which arbor rests in holes in the side plates of the machine, that instead of being round are elongated vertically, so as to allow to the arbor and its connections a little vertical motion. This arbor carries a curved piece, $n^4$, which, in the middle of its curve, throws out a little projection, $n^5$.

This curved piece is hinged to two pieces $n^6 n^6$, hanging from the eccentric arbor $n^4$ of the two wheels $c^6$ and $c^7$, and at their upper ends $n^7 n^7$ loosely encircling the said arbor, so as to receive motion from its eccentricity.

As they raise the middle of the curved piece $n^4$ its lighter end $n^5$ rises, and its motion is about the axis $n^3$. But when the poise just balances the load, and the scale-beam being level, neither magnet acts, then the shifter $d$ hangs vertically, and its thin end carries a shoulder, $n^9$, just over $n^5$, the projection from the curved piece $n^4$. This prevents $n^5$ from rising, and the lifting motion of $n^6 n^6$ carries up the other end of $n^4$, with the connected arbor $n^3$ and its pawl $n^2$. Therefore, as soon as the machine has finished the operation of weighing, the arc $n$ is raised notch by notch until it strikes the fan $c^{14}$ and stops the motion of the clock-work.

The lever $d$ is liable to be moved when $n^5$ is elevated into its path at $n^9$. I therefore connect the extension of $d$ by a hinge, and hold it to its vertical position by a small weight, $n^{10}$, which is readily pushed aside if $n^9$ strikes upon the side of $n^5$, but which holds $n^9$ with sufficient force to secure that it shall perform its office when $n^5$ rises against it from below.

The pawl $n^{14}$, which holds up the arc $n$ as high as $n^3$ has carried it, is fixed upon its arbor and moves with it.

Fixed upon the same arbor and close to the side plate of the machine is a light spring arm, $n^{12}$, curved near the end, and at its lower edge almost in contact with the end of the winding-barrel $c^1$.

Projecting from the end of $c^1$ is a small pin, $n^{13}$, so placed and shaped as to pass $n^{12}$ when the weight is running down, but to engage and lift it when the barrel is turned the other way in winding.

Lifting $n^{12}$, the arbor $n^{11}$ is slightly rotated, and its pawl is lifted, carrying before it the pawl $n^2$, and entirely releasing the arc $n$, which then falls. Thus the act of winding results in withdrawing the stop and preparing the machine to weigh another load.

The action of the register or type-wheels remains to be described.

Upon the arbor $b^2$ $b^3$, which carries the screw, is fixed a spur-wheel, $e$, gearing with a precisely similar wheel, $e^1$, on an arbor near the front of the machine. This wheel carries the register-wheel of units, $e^2$ bearing upon its edge the ten numerals.

As a complete rotation of the screw carries the poise along the graduated scale-beam over a space answering to ten pounds, the position of the poise will be correctly indicated by the front figure of this wheel.

When the rotation of this wheel is changing its front figure from 9 to 0 the next, or tens-wheel, is moved through one-tenth of a revolution. The device effecting this is original, and I suppose new.

The units-wheel carries on its side a somewhat smaller wheel, fastened to it, in a mortise of which slides the piece $e^3$, being pressed out by a light spring, as shown in fig. 2, where it is uncovered as far as the broken line for this purpose.

This sliding piece carries a little projection which passes just out of contact with the ends of the teeth of a ten-toothed spur-wheel, attached permanently to the side of the tens-wheel $e^4$.

Close to these wheels, and on a parallel axis, is a cylinder, $e^7$, so placed as to be in the path of $e^3$, and when the front figure of the units-wheel is changing from 9 to 0 to force $e^3$ in toward the axis, so that its projection shall engage one of the teeth of the spur-wheel on the side of the tens-wheel $e^4$, and move that wheel forward one-tenth of a revolution.

The tens-wheel $e^4$ carries a similar sliding piece $e^5$ which, striking the cylinder $e^7$ at the proper time, is carried against the hundreds-wheel and moves that. The arrangement is such that the proper decimal changes will be made whichever way the units-wheel is moved.

By this device I arrange that the front line of figures upon these wheels shall correspond to and correctly indicate the position of the weighing poise, and when the machine stops, the weight of the load.

The figure-wheels of tens and hundreds being loose upon their arbor, are kept from accidental displacement by rollers $e^8$ $e^9$, held by tight springs against the ten-toothed spur-wheels.

If the loads are of such a sort as always to exceed a given weight, as for example, wheelbarrow loads of coal would exceed two hundred pounds, I propose to put weights drawing that minimum amount upon the usual counterpoise hook at the end of the scale-beam, and weigh by the sliding poise the excess above that weight, and to use the register-wheels to indicate the total weight of each load by setting the hundreds-wheel forward to make the register show two hundred when the poise is at zero.

The figure-wheels are convenient for indicating the weight in a manner to be easily read, but I propose to make them with raised figures, and to use them as type-wheels.

I have, in another application for patent of even date herewith, described in detail a machine for printting the weights upon a strip of paper.

I do not propose to embody that description in this specification, but I wish to put upon record my purpose to use that mechanism so far as it is adapted for this purpose, in connection with the machine herein described, in order to print, in the manner described in my other said application, the weight of loads as ascertained by this magnetic machine.

The motion of the stop-work herein described may be used, instead of merely stopping the machine, to release a printing-hammer, or directly to press the paper upon suitable type-wheels.

Having described what I now consider the best method of carrying out my invention,

I claim as follows:

1. Combining with a weighing-scale, electro-magnets, to control the motion of the sliding poise, substantially as specified.

2. Using, as herein set forth, the motion of the beam or other moving part of the scale, to make electrical connection with one of two electro-magnets when the poise requires to be moved, and to break the same when, by such movement, the scale is balanced.

3. In an automatic weighing-machine, a double clutch, or its equivalent, controlled by armatures held within attracting distance of their magnets, as specified.

4. The movable piece $e^3$, and its holding spring or equivalent, carried upon the several register-wheels, in combination with the roller $e^7$, or its equivalent, whereby the piece $e^3$ is at one point in each revolution forced to engage with and move the higher wheel, as and for the purpose herein specified.

5. The mechanism $n$ to $n^{10}$, for stopping the machinery when each load has been weighed.

6. The mechanism $n^{11}$ to $n^{13}$, for withdrawing the stop when another load is to be weighed.

7. The within-described electro-magnetic weighing-machine, automatically determining the weights of varying loads by a poise, moved by mechanism under electro-magnetic control, and indicating the same by figure-wheels, the whole being constructed and operating substantially as set forth.

In testimony whereof I have hereunto set my name in presence of two subscribing witnesses.

HENRY FAIRBANKS.

Witnesses:
THADDEUS FAIRBANKS,
A. N. FAIRBANKS.